United States Patent
Reithel

[11] Patent Number: 6,161,689
[45] Date of Patent: Dec. 19, 2000

[54] SAW BLADE CADDY

[76] Inventor: Frederick C Reithel, 623 Caledonia Rd., Dix Hills, N.Y. 11746

[21] Appl. No.: 09/449,819
[22] Filed: Nov. 26, 1999
[51] Int. Cl.[7] .................................................. B65D 85/02
[52] U.S. Cl. .......................... 206/303; 206/372; 206/493; 211/41.1; 220/481
[58] Field of Search .................. 206/349, 372, 206/493, 303; 211/41.1; 248/309.1; 220/480, 481

[56] References Cited

U.S. PATENT DOCUMENTS

| | | | |
|---|---|---|---|
| 3,035,424 | 9/1962 | Reinhard | 206/303 |
| 3,897,883 | 8/1975 | Cederstrom | 220/481 |
| 4,588,082 | 5/1986 | Ridings | 206/303 |
| 4,784,263 | 11/1988 | Stanley | 206/349 |
| 4,848,571 | 7/1989 | Fullar | 206/303 |
| 4,896,771 | 1/1990 | Edwards | 206/349 |
| 4,921,153 | 5/1990 | Smith | 206/349 |
| 5,078,266 | 1/1992 | Rackley | 206/303 |
| 5,456,057 | 10/1995 | Bannon et al. | 206/493 |
| 5,647,502 | 7/1997 | Marsh | 220/481 |

Primary Examiner—Luan K. Bui
Attorney, Agent, or Firm—Michael I Kroll

[57] ABSTRACT

The present invention 10 discloses a device for safely storing and transporting saw blades 18 and related tools 34 for installation thereof. The present invention discloses a flat base plate 12 having a spindle 40 centrally located which has threaded fasteners 14 on both sides of the flat plate 12 so that saw blades 18 can be fastened onto both the front and rear face of the base plate 12. The base plate 12 also discloses spacers 22 on its rear side which serve to space the plate away from an object 48 upon which it is mounted. The plate 12 is also equipped with a tool holder 26 attached thereto which provides a compartment 30 for installation tools 34 to mount the blade onto the piece of machinery upon which the blades 18 are to be used. The base plate 12 also provides a carrying handle 24 for easily carrying the base plate 12 and saw blades 18 from one location to another. The present invention also discloses an upper and lower mounting bracket 50, 52 upon which the base plate 12 can be mounted. An additional embodiment discloses a carrying receptacle formed by a back plate 62 having side tracks 74 thereon which provide a track in which the present invention 10 can be mounted and carried therein and using a hinged cap 66 on its top in order to securely hold the saw blade carrying unit 10 therein.

14 Claims, 13 Drawing Sheets

SAW BLADE CADDY

BACKGROUND OF THE INVENTION

1. Field of the Invention

The present invention relates generally to tool storage units and, more specifically, to a mountable storage frame having a saw blade carrier unit contained therein or mounted thereon whereby said carrier unit having a centrally located spindle having a centrally located threaded member with removable fastener and a blade cover plate whereby a plurality of saw blades can be mounted on said spindle being held in place by said blade cover plate and fastener whereby said saw blades can be carried to and from a job site providing means for carrying said plurality of saw blades as well as protecting the blade edges from damage or from causing damage.

Further said carrier unit having a tool holder having spring compression means contained therein for holding tools that can be used in installing said saw blades onto a predetermined tool and removal of said saw blades from said tool and optionally said carrier unit can have a plurality of spacer members mounted on one side of said carrier unit providing a protected area for said saw blades as well as keeping said carrier unit away from the mounting surface while contained by the mounting frame. Further said saw blade carrier unit having a top mounted handle.

The mountable storage frame is comprised of upper and lower bracket members wherein said carrier unit handle is mounted onto the upper bracket and rests within the lip of the lower bracket. Alternately there is another embodiment provided for said mountable storage frame having a back plate having side track members connected by a base member forming a receptacle for the blade carrier unit. Further said side track members each having a spring hinged cap member covering the top of said track member for retaining said carrier unit within said mountable storage frame.

2. Description of the Prior Art

There are other tool storage units which provide for the storage of various types of tools. While these storage units may be suitable for the purposes for which they where designed, they would not be as suitable for the purposes of the present invention as heretofore described. It is thus desirable to provide a tool storage unit having the aforementioned properties for the purposes of storing saw blades as well as being able to dismount the carrier unit whereby a number of saw blades can be carried to and from a job site.

SUMMARY OF THE PRESENT INVENTION

The present invention discloses a device for safely storing and transporting saw blades and related tools for installation thereof. The present invention discloses a flat base plate having a spindle centrally located which has threaded fasteners on both sides of the flat plate so that saw blades can be fastened onto both the front and rear face of the base plate. The base plate also discloses spacers on its rear side which serve to space the plate away from an object upon which it is mounted. The plate is also equipped with a tool holder attached thereto which provides a compartment for installation tools to mount the blade onto the piece of machinery upon which the blades are to be used. The base plate also provides a carrying handle for easily carrying the base plate and saw blades from one location to another. The present invention also discloses an upper and lower mounting bracket upon which the base plate can be mounted. An additional embodiment discloses a carrying receptacle formed by a back plate having side tracks thereon which provide a track in which the present invention can be mounted and carried therein and using a hinged cap on its top in order to securely hold the saw blade carrying unit therein.

A primary object of the present invention is to provide a saw blade carrier unit which will be used to protect saw blades while not in use and provide means for carrying and storing a plurality of saw blades.

Another object of the present invention is to provide a saw blade carrier having a handle, tool holder, spindle and spacers.

Yet another object of the present invention is to provide a saw blade carrier which will protect the saw blade teeth from damage as well as protect them from causing damage while being transported.

Additional objects of the present invention will appear as the description proceeds.

The present invention overcomes the shortcomings of the prior art by providing a mountable storage frame having a removable saw blade carrier unit having a centrally located spindle whereupon a plurality of saw blades can be mounted and held in place by a blade cover plate and fastener thereby allowing the portage of a plurality of various sized saw blades while protecting the blade edges from damage or from causing damage. Further said carrier unit provides a tool holder having spring compression means contained therein for holding tools that can be used in installing said saw blades and additionally said carrier unit can have a plurality of spacer members mounted on one side of said carrier unit providing a protected area for said saw blades as well as keeping said carrier unit away from the mounting surface while contained with the mounting frame. Further said saw blade carrier unit having a top mounted handle.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
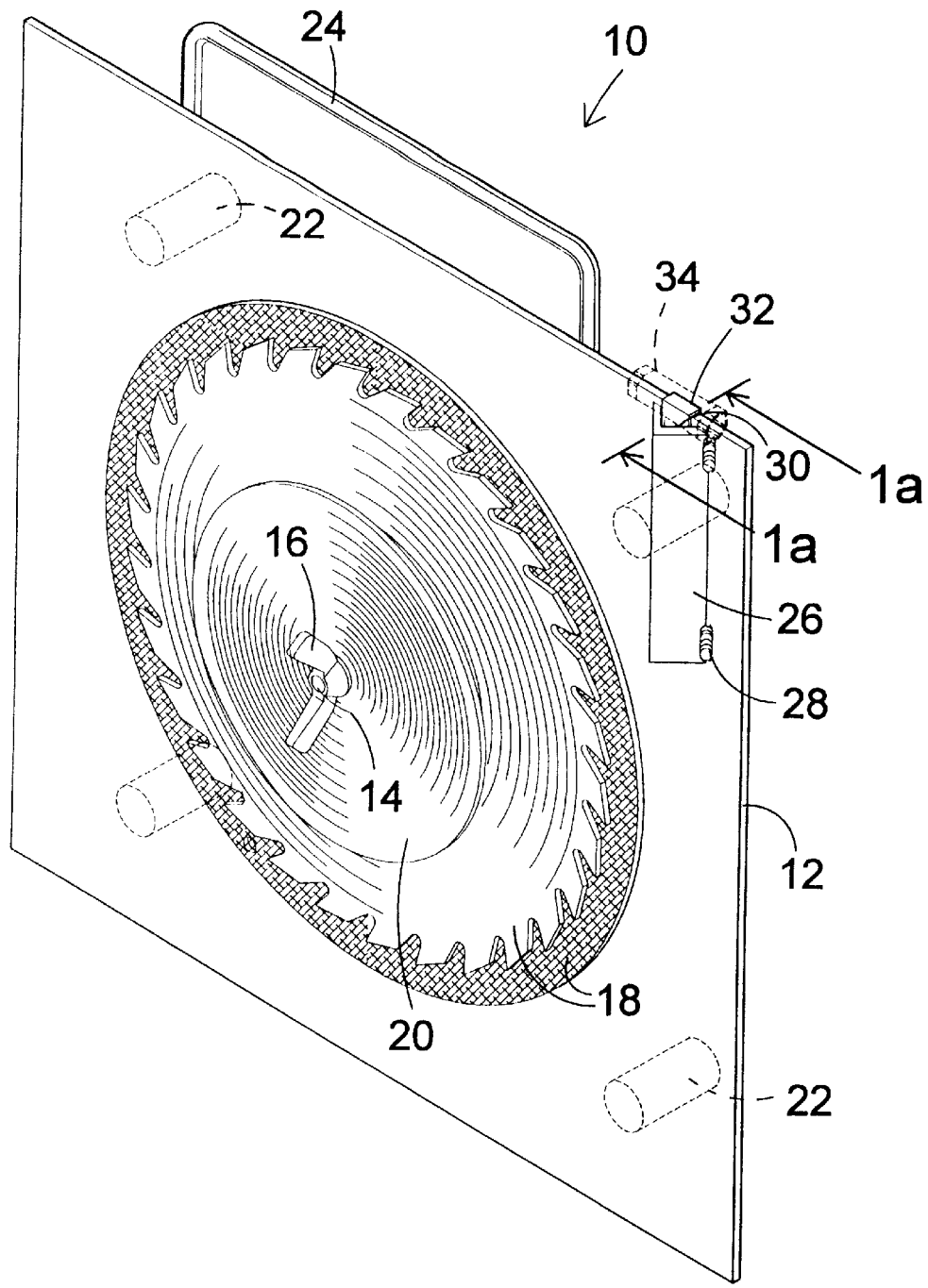
FIG. 1 is a perspective front view of the preferred embodiment of the saw blade carrier unit in use. Shown is a plurality of saw blades mounted on a spindle, not shown, and having a handle providing portage and a tool holder having spring retention means contained therein for gripping and holding a tool.

With regard to the reference numerals used, the following numbering is used drawings.

10 present invention
12 frame
14 fastener means
16 fastener
18 blade
20 cover plate
22 spacer
24 handle
26 tool holder
28 attachment means
30 compartment
32 spring
34 tool
36 spring retention means
38 spring fastener
40 spindle
42 spindle attachment means
44 spacer attachment means
46 handle attachment means
48 object
50 upper bracket
52 lower bracket
54 attachment means
56 lip
58 aperture
60 track
62 back plate
64 side track members
66 hinged cap
68 hinge
70 coil spring
72 attachment means
74 track for carrier
76 space

DESCRIPTION OF THE PREFERRED EMBODIMENT(S)

Turning now descriptively to the drawings, in which similar reference characters denote similar elements throughout the several views, FIGS. 1 through 12 illustrate the present invention being a device for storing and transporting saw blades and related tools.

Turning to FIG. 1, therein is shown a front perspective view of the preferred embodiment of the present invention, generally shown at 10. The present invention discloses an apparatus for storing and transporting saw blades and related tools. Shown is the generally square shaped base member or frame 12 which has a threaded spindle 14 located at its center along with removable fastener means 16 mounted thereon, e.g., a wing nut or like means. Shown mounted on the spindle are a plurality of saw blades 18 along with a circular blade cover plate 20 which holds the blades 18 onto the frame 12. The cover plate is held onto the frame by the threaded spindle fastener means 16 so that the blades can be stored and transported to and from a job site in such a way that the blades will not be damaged nor will the blades cause damage to any other objects or person. Note that the frame 12 has mounted on its opposite or back side spacer members 22 in order to keep the frame away from the proximate object or surface upon which the frame is mounted. Also shown is a handle 24 for carrying the frame 12 about. Additionally, therein is shown a tool holder 26 having means 28 for attachment to the frame 12, e.g., welding or like means. Also shown within the tool holder 26 is the compartment or cavity 30 formed on the interior of the tool holder for the purpose of insertion therein of a tool 34 shown in outline. Also shown is a spring 32 which frictionally holds the tool 34 on the interior of the tool holder 26.

Figure 1A:
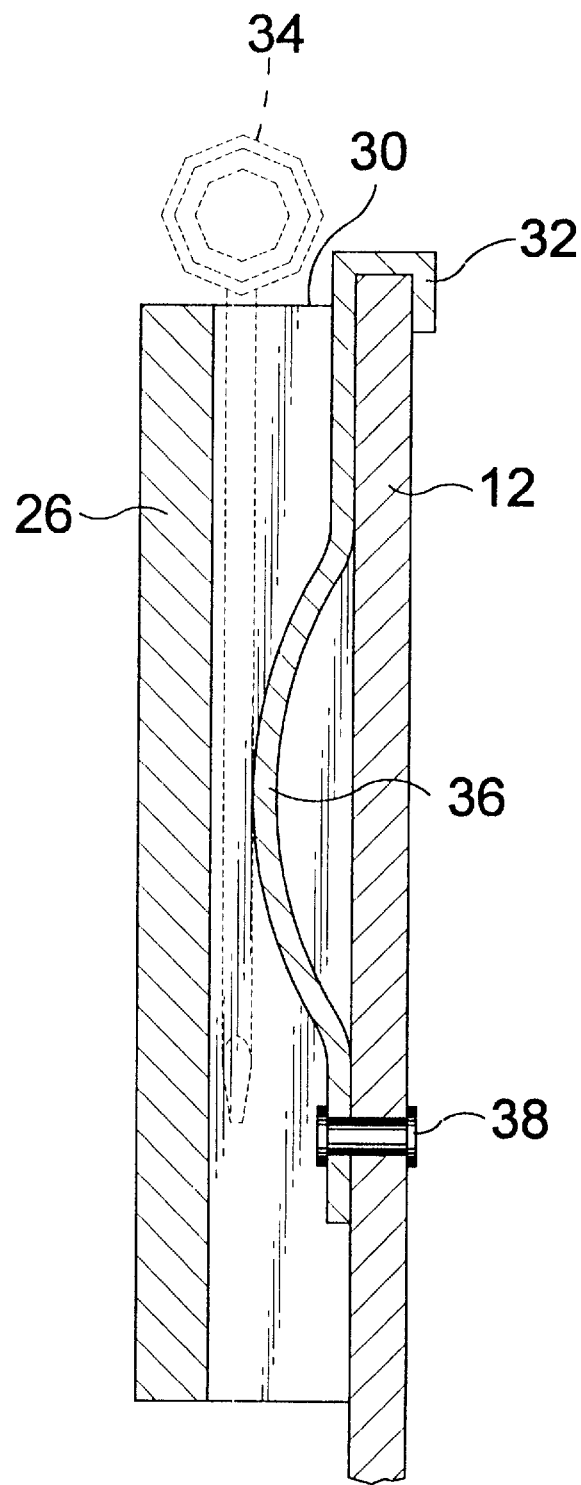
FIG. 1A is a cross sectional view, taken from FIG. 1 as indicated, of the tool holding compartment having spring retention means for holding a tool. Also shown, in outline, is a combination socket wrench and screw driver which can be used to install and remove the saw blade from a tool.

Turning to FIG. 1A, therein is shown a cross sectional view taken from FIG. 1 as indicated, of the tool holder 26 showing the compartment 30 for holding a tool therein having a spring retention means 32 mounted onto the frame or carrier unit 12 wherein the spring 32 provides retention means 36 for frictionally or otherwise holding the tool shown in outline 34 which can be used to install and remove the saw blade from the machinery upon which it is to be used. Also note that fastener means 38 are also shown for attaching the spring 32 to the frame member 12.

Figure 2:
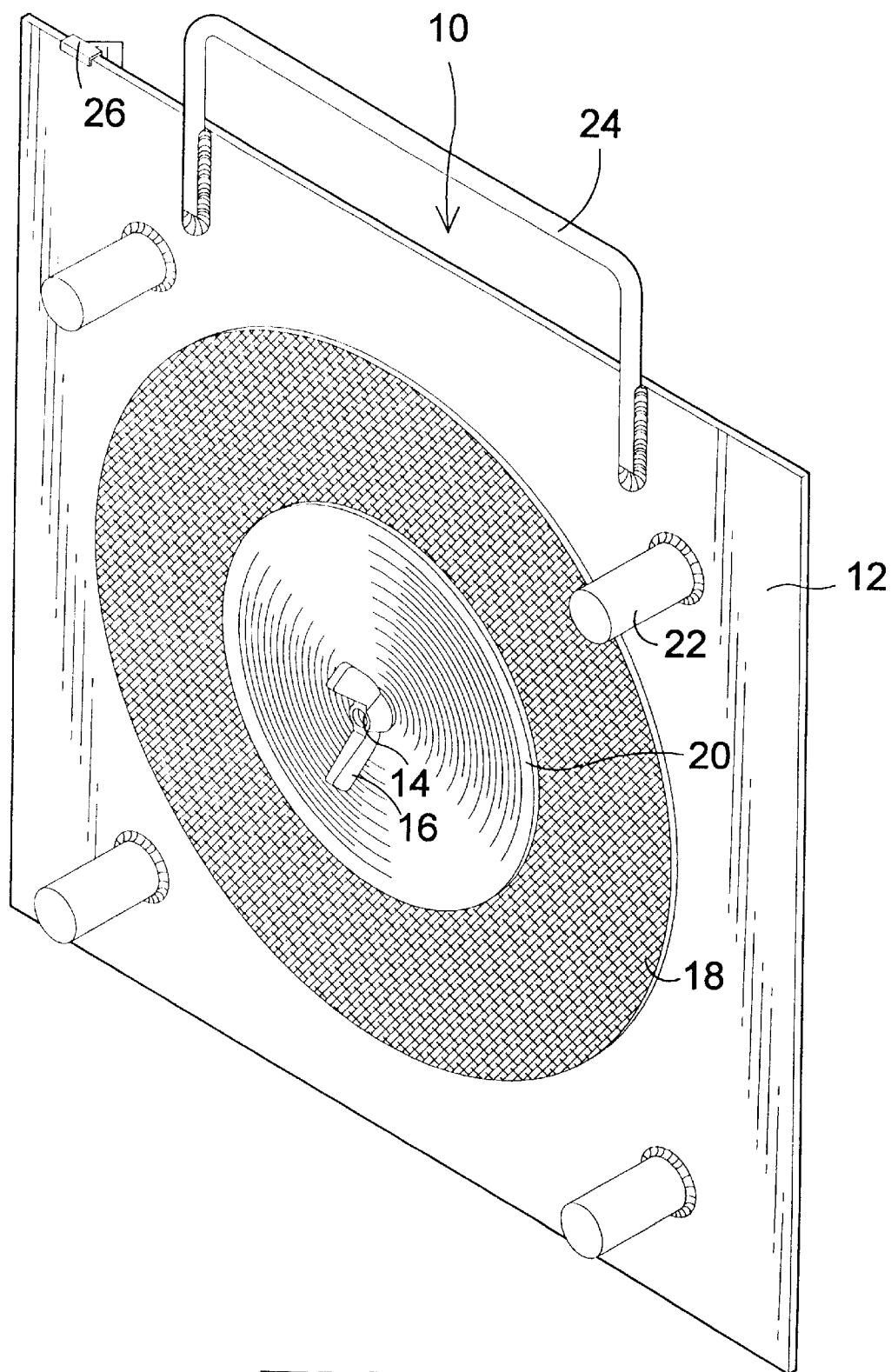
FIG. 2 is a perspective rear view of the preferred embodiment of the saw blade carrier unit having a centrally spaced spindle and a number of spacers for protecting the spindle mounted blades.

Turning to FIG. 2, therein is shown a rear perspective view of the preferred embodiment of the present invention 10. Therein is shown a saw blade carrier 12 having a centrally located threaded spindle 14 having a blade 18 attached thereto along with the cover plate 20 for holding the blade and the fastening means 16 which holds the cover plate on the carrier 12. Also shown are a number of spacers 22 for protecting and separating the blades mounted on the spindle from an object upon which the carrier 12 is mounted. Also shown is the handle 24 which is used to carry the frame 12 from place to place. Additionally shown, is the tool holder 26. Note that the threaded spindle 14 communicates with both the front and rear sides of the base 12.

Figure 3:
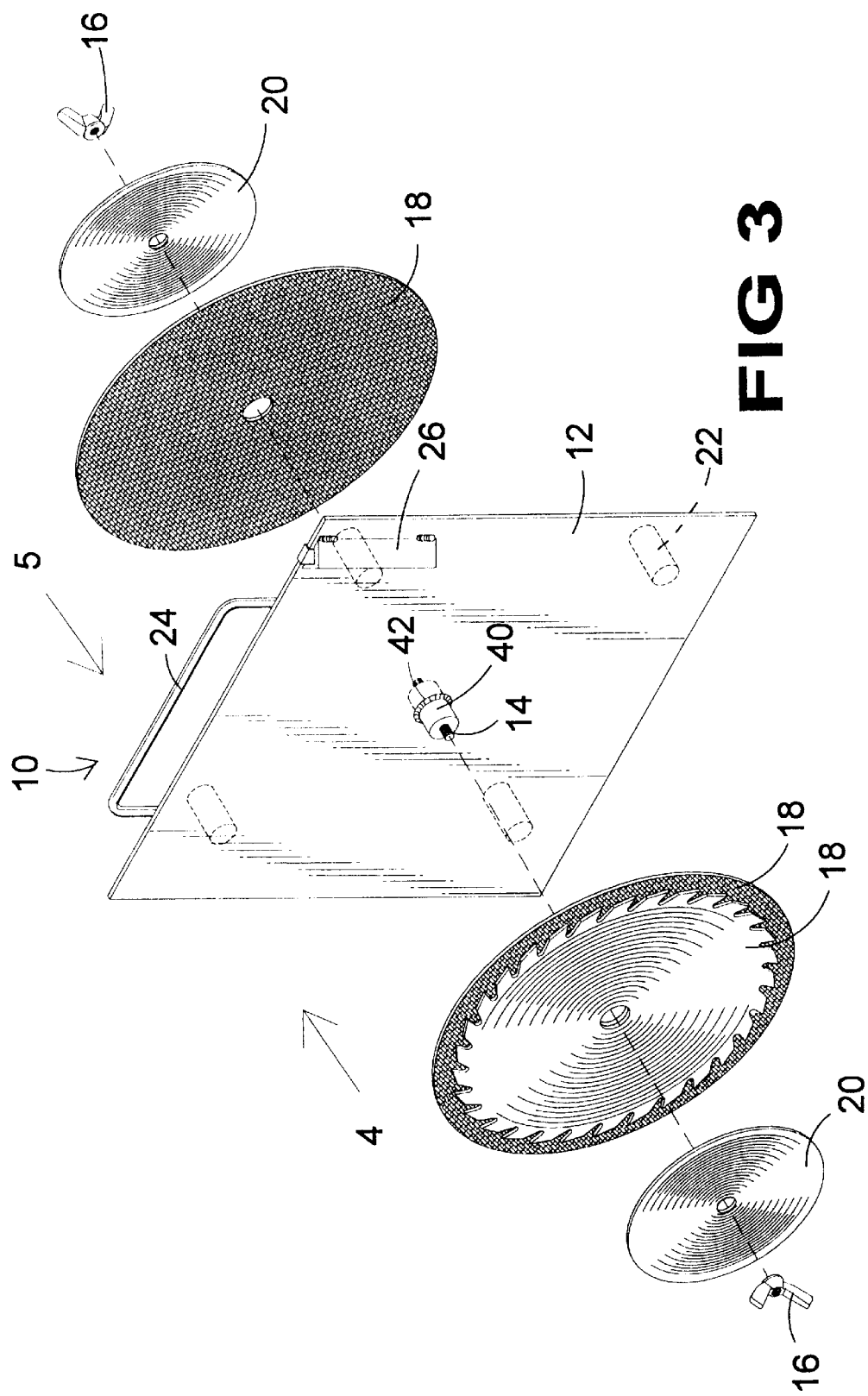
FIG. 3 is an exploded view of the saw blade carrier having a top mounted handle, front surface mounted tool holder, centrally located spindle having a threaded member and fastening means. Also shown are a number of attached blades.

Turning to FIG. 3, therein is shown an exploded view of the present invention 10. Shown therein is the frame 12 having the carrying handle 24 along with the spacers 22. Also shown is the spindle 40 which is centrally attached to the frame 12. The spindle has attachment means 42 for connecting it to the frame 12. Also shown is the threaded fastener means 14, the fastener 16 along with the cover plate 20, blades 18 and tool holder 26.

Figure 4:
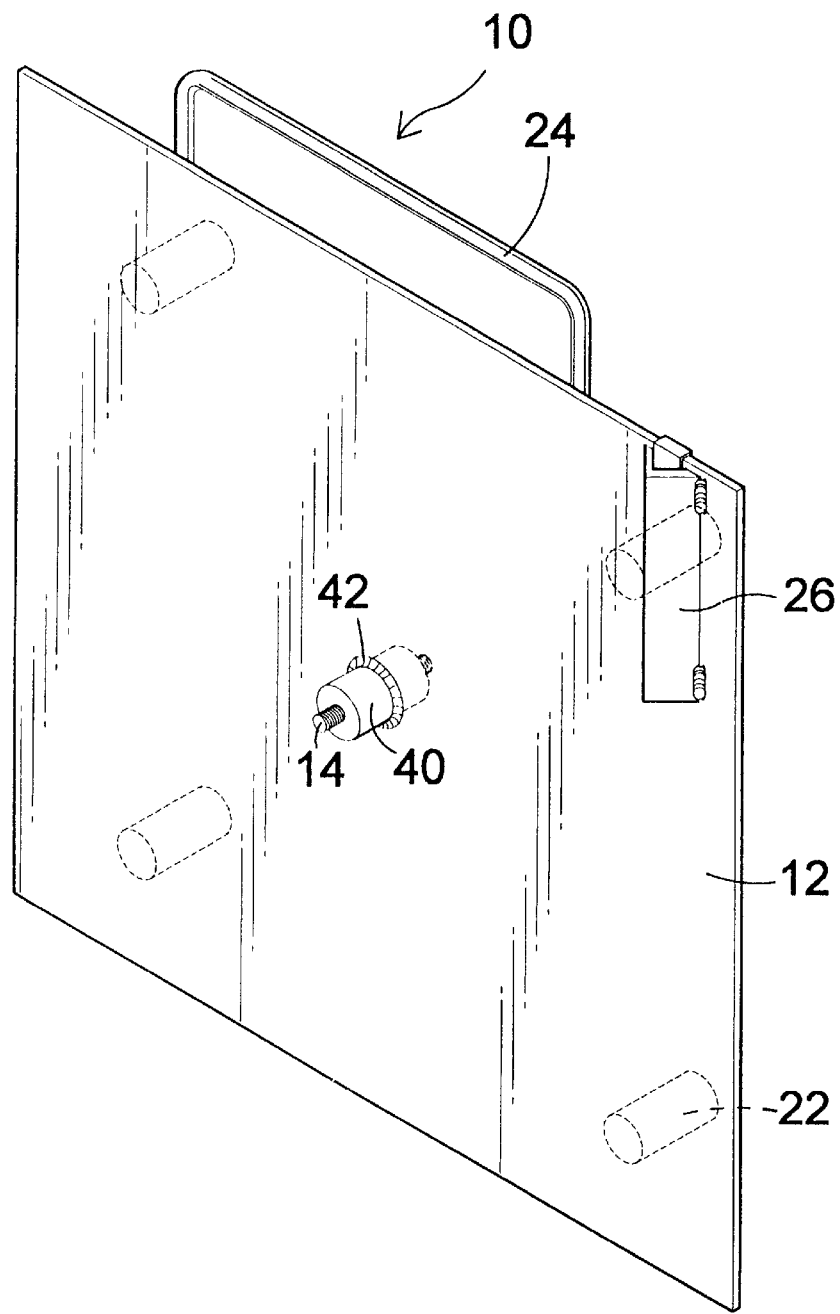
FIG. 4 is a perspective front view of the preferred embodiment of the saw blade carrier unit having a number of spacers rearwardly mounted and having a tool holding compartment having spring retention means contained therein and a top mounted handle.

Turning to FIG. 4, therein is shown a perspective view of the preferred embodiment of the present invention 10. Shown therein is the frame 12 along with the carrying handle 24. Also shown is the centrally mounted spindle 40 along with its mounting means 42, e.g., welding or the like and centrally located threaded fastener 14. Also shown on the rear side of the frame are spacers 22 along with the tool holder 26.

Figure 5:
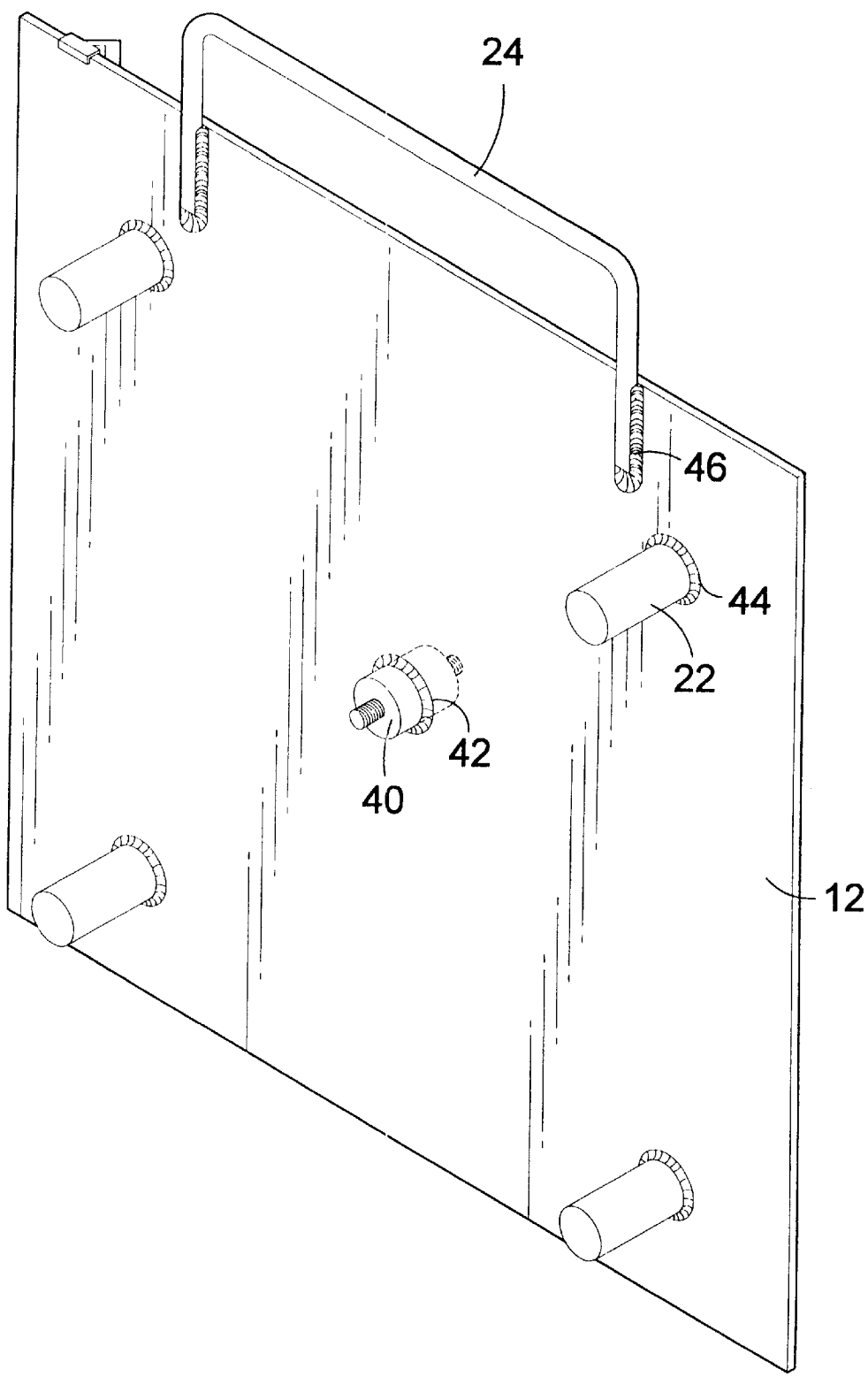
FIG. 5 is a perspective rear view of the preferred embodiment of the saw blade carrier unit having a number of spacers, having a tool holding compartment having spring retention means contained therein and a top mounted handle.

Turning to FIG. 5, therein is shown a rear perspective view of the preferred embodiment of the present invention 10. Shown therein is the frame 12 along with the carrying handle 24. Also shown is the centrally mounted spindle 40 along with its mounting means 42, e.g., welding or the like. Also shown on the rear side of the frame are spacers 22. Also shown is the tool holder 26. Also shown are mounting means 44 for attaching the spacers 22 to the frame 12 along with mounting means 46 for attaching handle 24 to the frame 12. These mounting means could be welding or the like.

Figure 6:
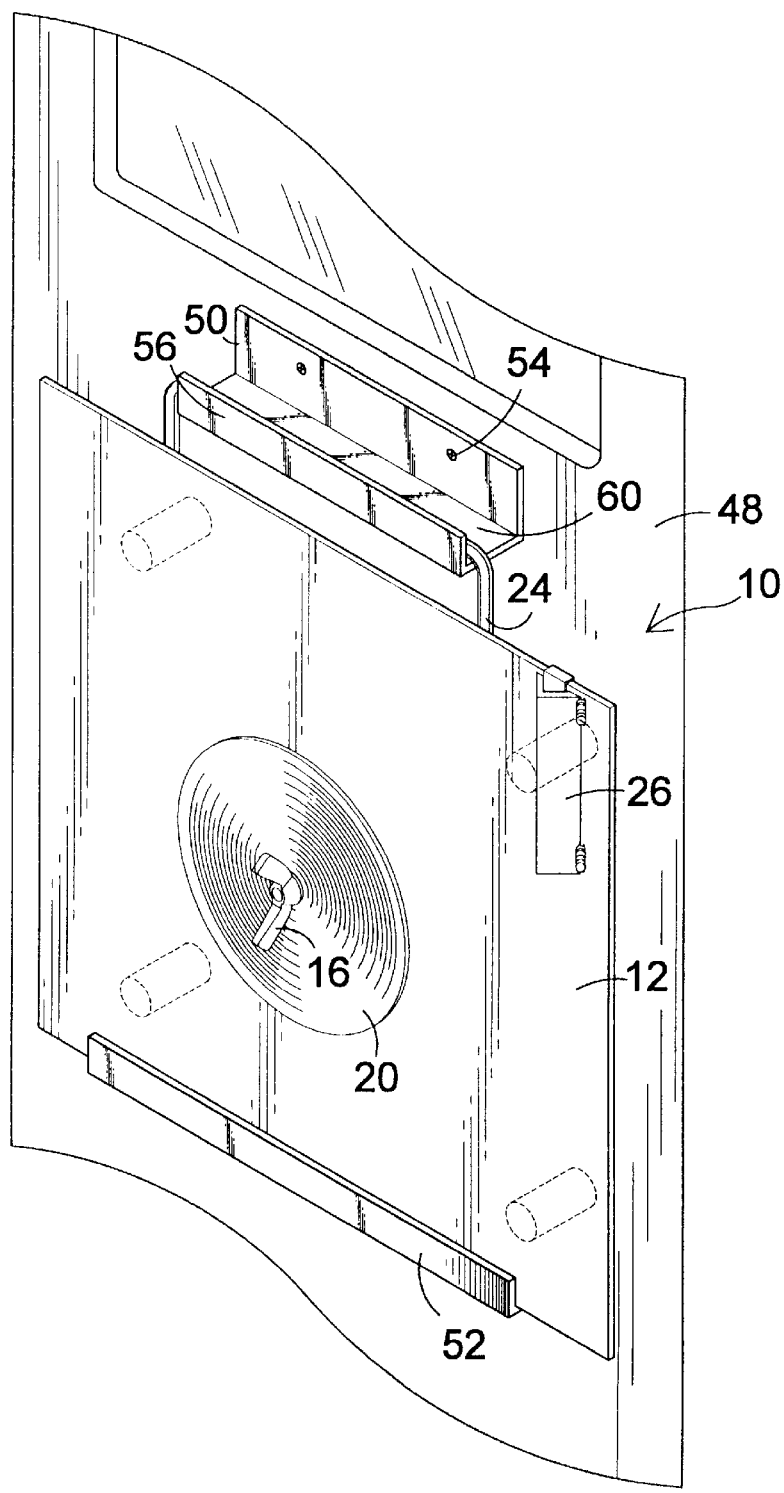
FIG. 6 is a perspective view of the saw blade carrier of the present invention and one embodiment of the mountable frame.

Turning to FIG. 6, therein is shown the present invention 10 mounted on a proximate object 48. The present invention 10 is mounted by means comprising an upper bracket 50 and a lower bracket 52. Means 54 for attaching the upper bracket 50 to the proximate object 48 are also disclosed. Other features from the previous drawings are also shown. Note that the handle 24 of the present invention 10 is mounted onto the upper bracket 50 and rests within a lip 56 which is turned vertically upward on the front edge of bracket 50 forming a track 60 therein which serves to keep the handle 24 from becoming dislodged from the mounting bracket 50.

Figure 7:
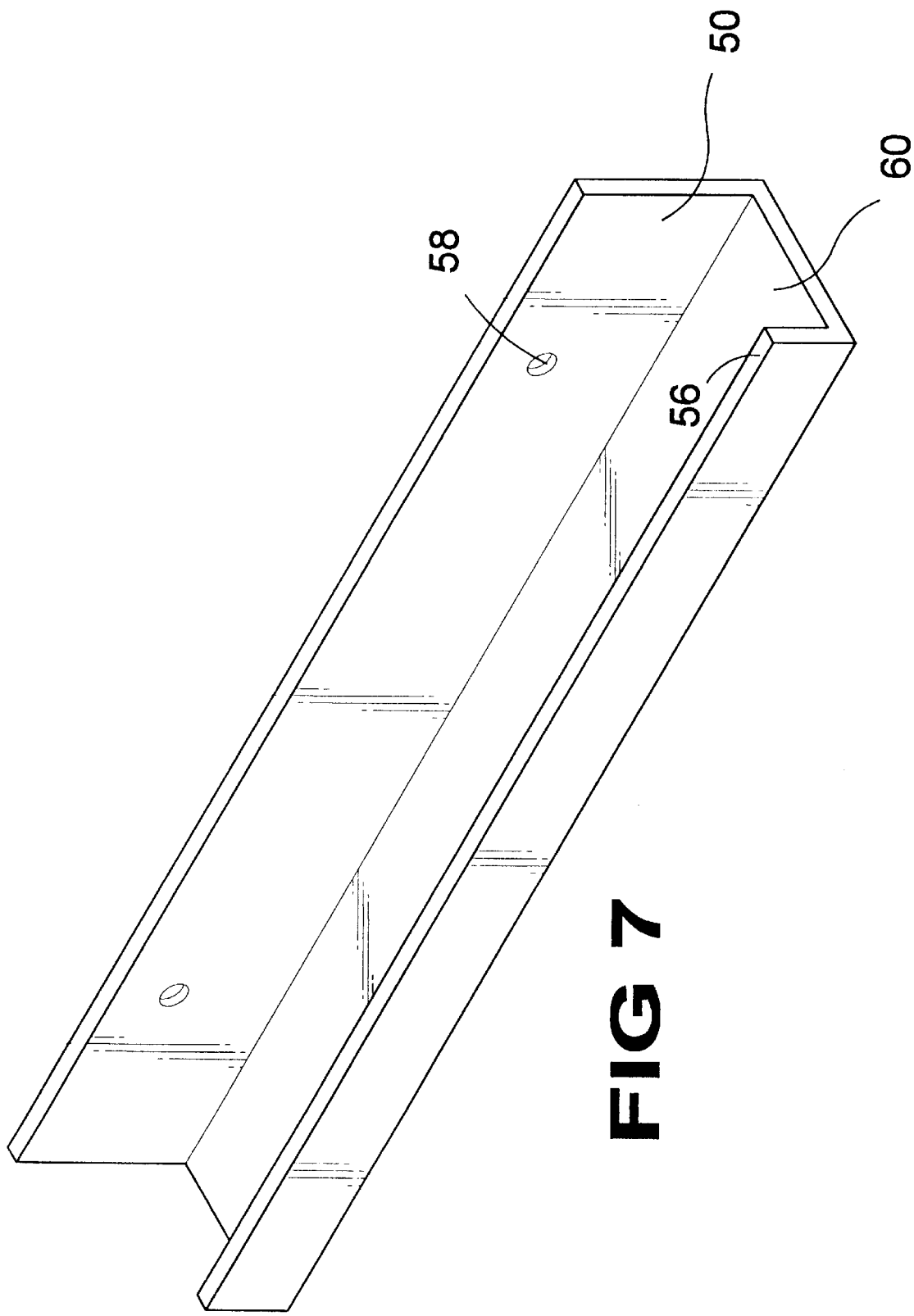
FIG. 7 is a perspective view of top bracket member of the present invention.

Turning to FIG. 7, therein is shown a perspective view of the top bracket member 50 of the present invention. Shown are apertures 58 through which fasteners 54 (not shown) pass in order to mount the bracket 50 onto a proximate object. Also shown is the front lip 56 which is raised in order to secure the handle 24 to the bracket 50 along with track 60 therein.

Figure 8:
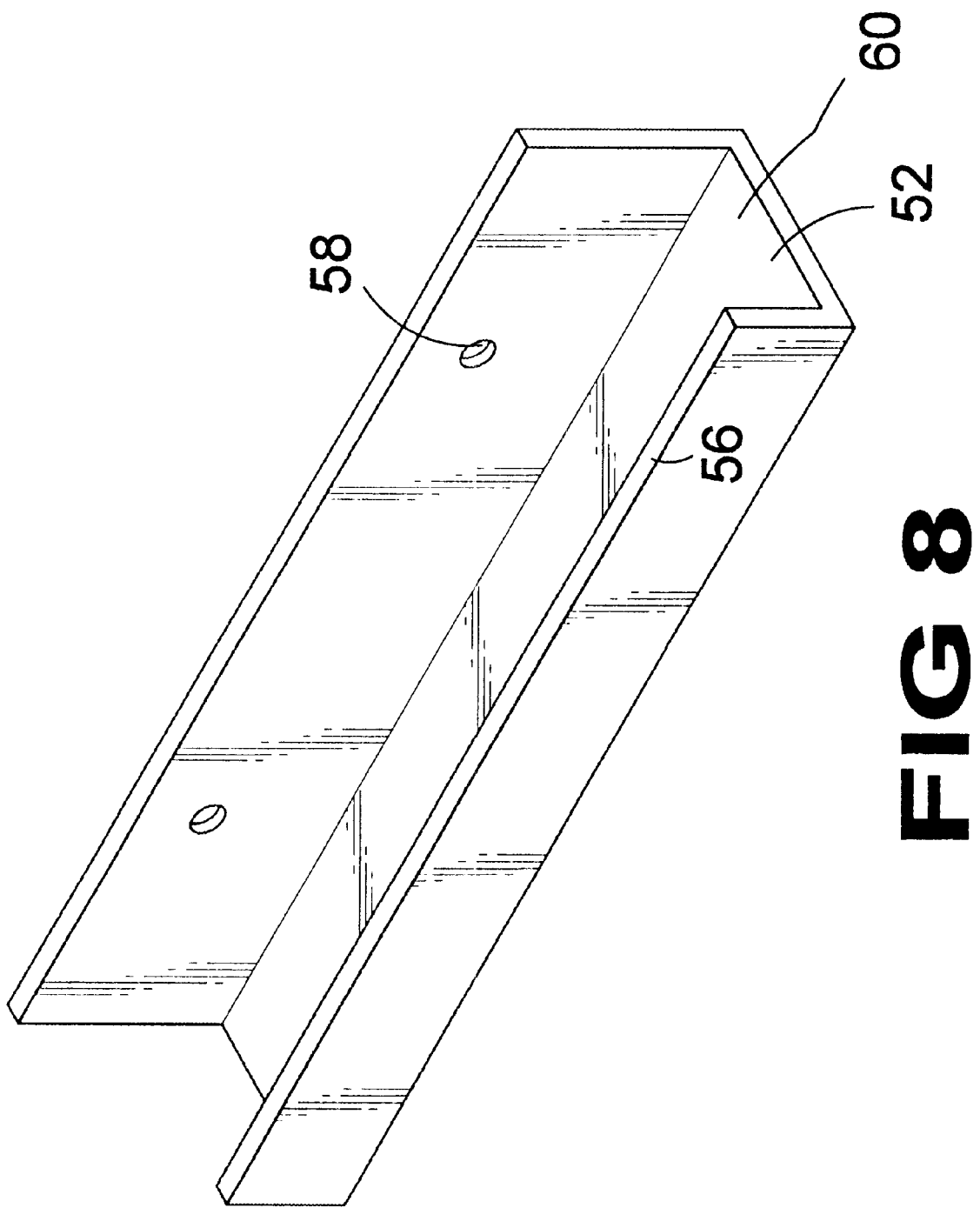
FIG. 8 is a perspective view of the bottom bracket member of the mountable storage frame.

Turning to FIG. 8, therein is shown a perspective view of the bottom bracket member 52 of the present invention. Shown therein are the apertures 58 though which fasteners mount the bracket onto a proximate object. Also shown is a front lip 56 is shown which serves to secure the present invention in its track formed by the bracket 52. Note that the track 60 is formed by the bracket and lip in which the present invention is secured.

Figure 9:
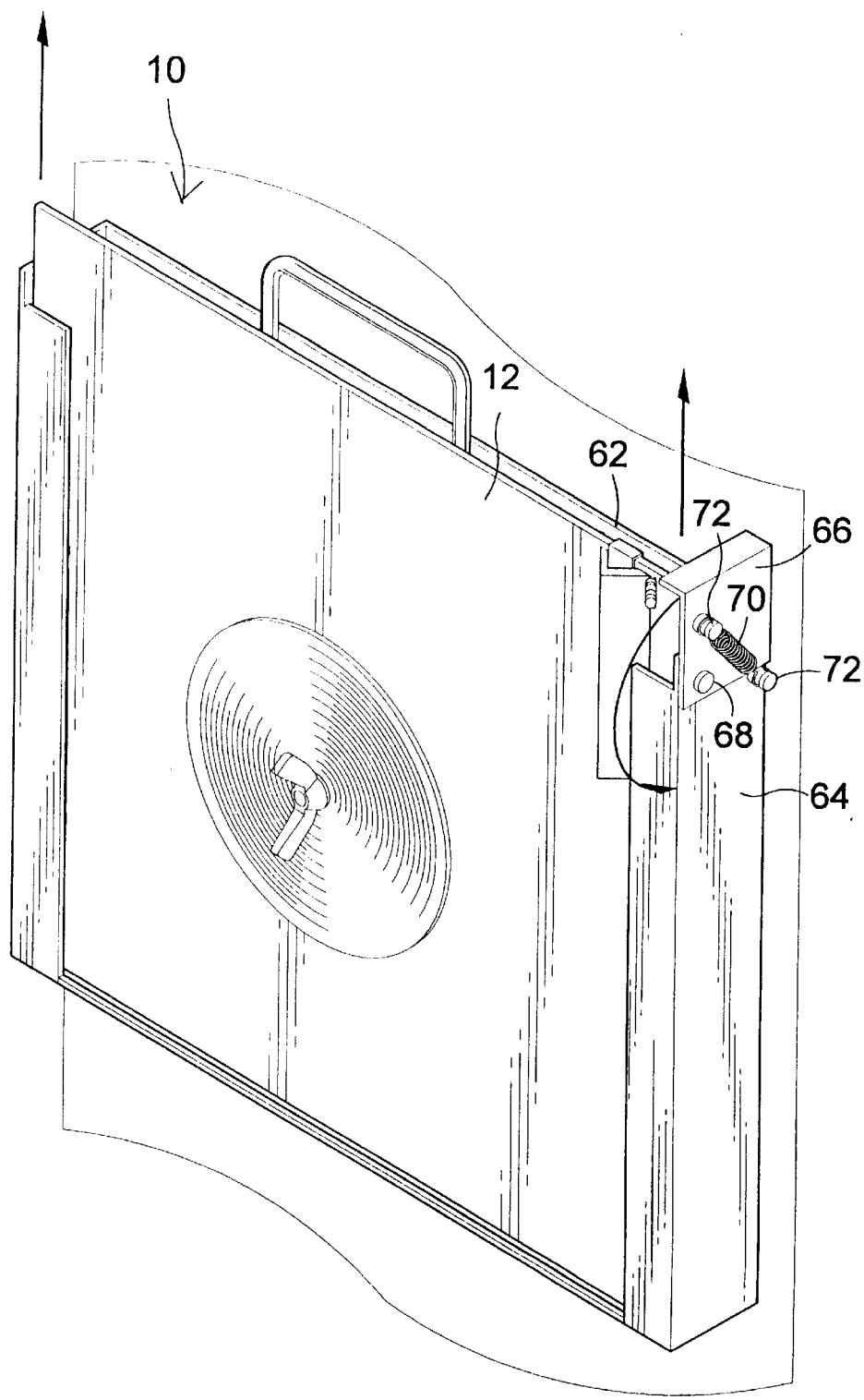
FIG. 9 is a perspective view of an alternate embodiment of the mountable storage frame having side track members and base plate providing a receptacle for the blade carrier unit and a cooperating spring cap member located at the top of the tracks for holding the blade carrier unit within the mountable storage frame.

Turning to FIG. 9, therein is shown a perspective view of an alternative embodiment of the storage frame having side track members 64 and a base plate 62 which together form a receptacle for the blade carrier unit 12 of the present invention 10. Also shown is a cooperating spring cap member 66 being hinged about hinge 68 having coil spring means 70 with attachment means 72 for closing resiliently the cap member 66 so that the blade carrier unit 10 is carried within the storage frame.

Figure 10:
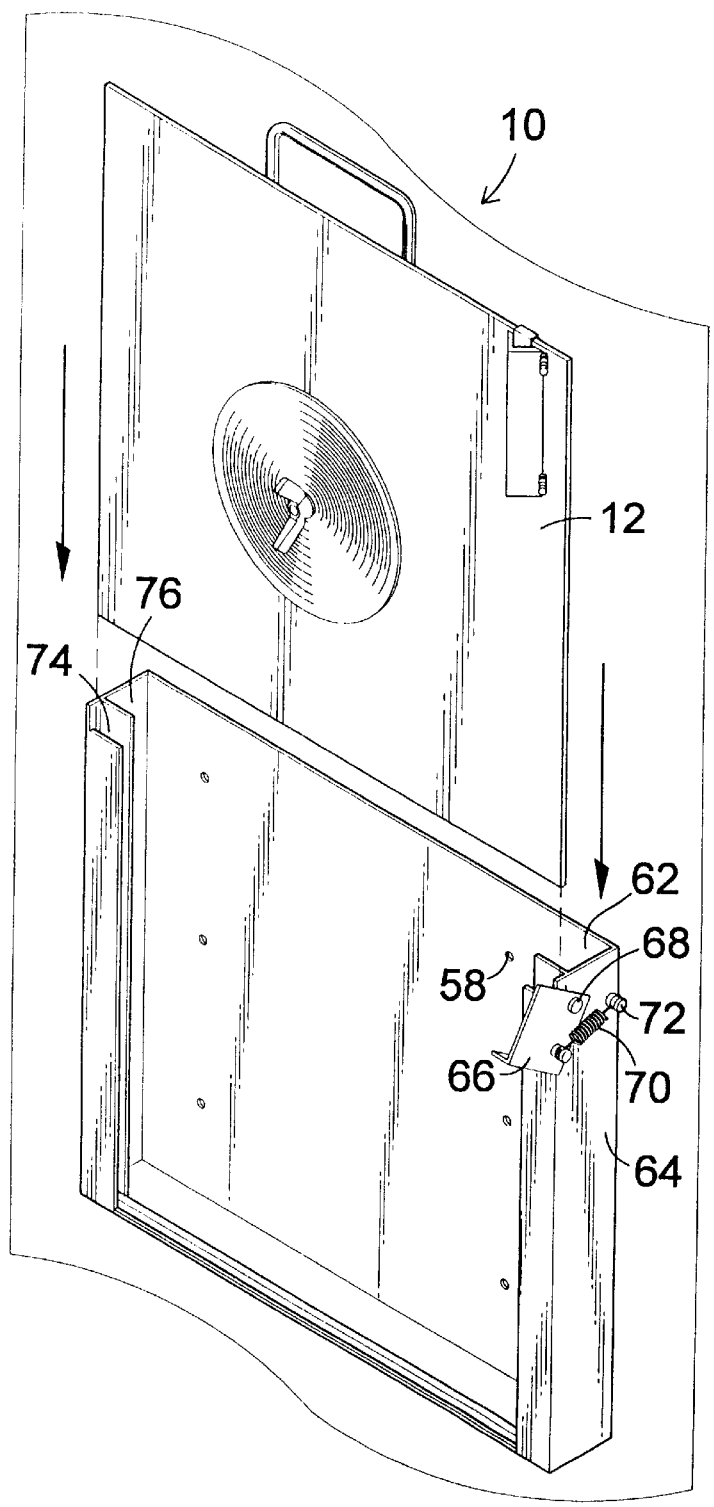
FIG. 10 is a perspective view of the alternate embodiment of the mountable storage frame having side track members and base plate providing a receptacle for the blade carrier unit and a cooperating spring cap member located at the top of the tracks for holding the blade carrier unit within the mountable storage frame. Shown is the mountable storage frame track caps in the open position allowing the blade carrier to be inserted.

Turning to FIG. 10, therein is shown a perspective view of the alternative embodiment of the present invention 10. Shown therein is the receptacle and/or carrying unit having a back plate or base plate 62 along with side track members 64 which together form track 74 within which the present invention 10 can be slidably inserted. Note also that a cavity or space 76 is provided in order to house the blades in a space wherein the blades cannot be damaged or cause damage to anything else. Also note that the back plate 62 has apertures 58 therein for being mounted to a proximate object. Note also that the hinged cap member 66 is shown in the open position thereby allowing the carrier unit 12 of the present invention 10 to be inserted therein. Also shown is the spring 70, the spring attachment means 72, along with the hinge 66.

Figure 11:
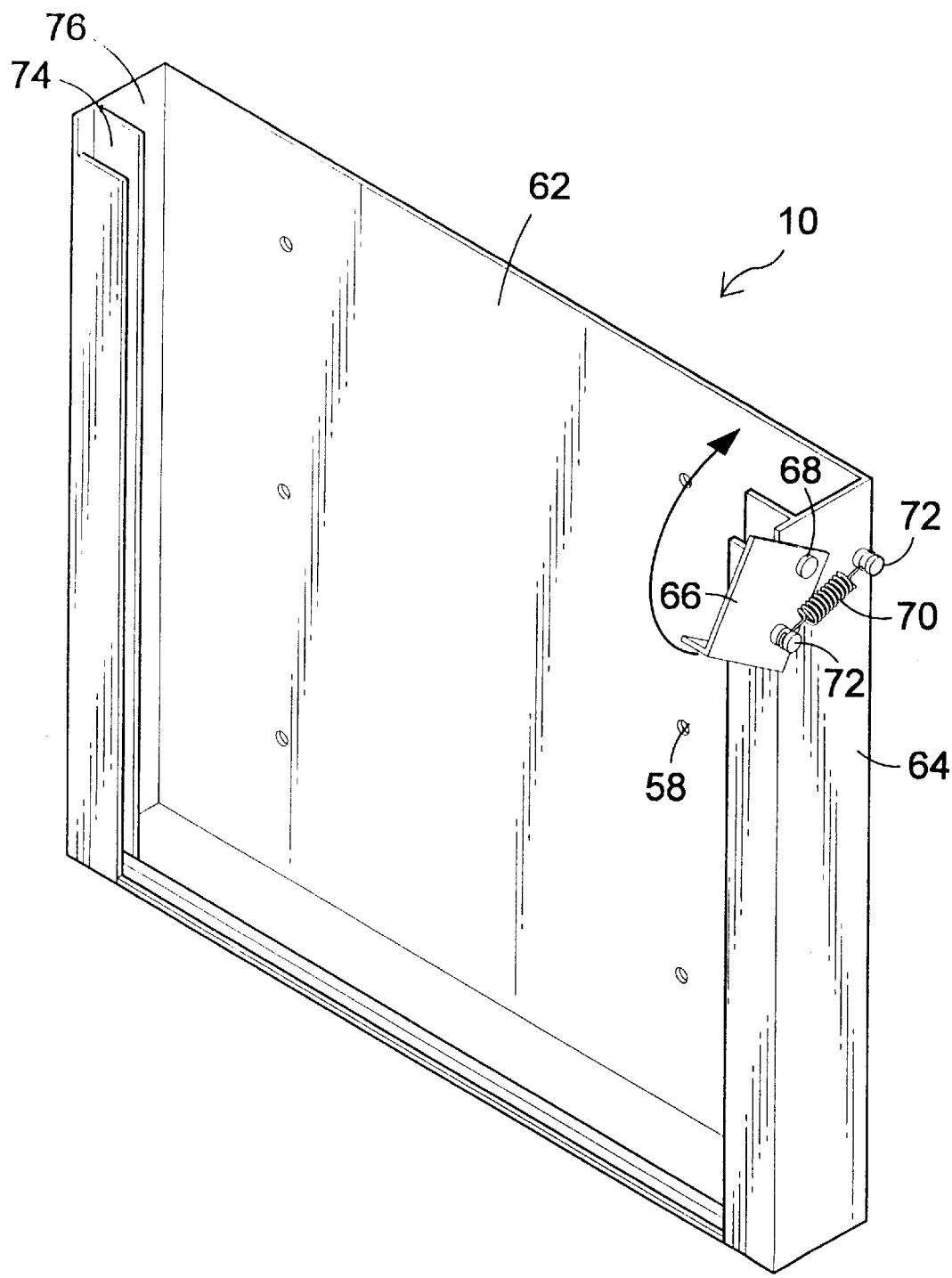
FIG. 11 is a perspective view of the alternate embodiment of the mountable storage frame having side track members and base plate providing a receptacle for the blade carrier unit and a cooperating spring cap member located at the top of the tracks in the open position allowing the blade carrier to be inserted.

Turning to FIG. 11, therein is shown a perspective view of the alternative embodiment of the present invention 10. Shown therein is the carrying unit having a back plate or base plate 62 along with side track members 64 which together form track 74 within which the present invention 10 can be slidably inserted. Note also that a cavity or space 76 is provided in order to house the blades in a space wherein the blades cannot be damaged or damage anything else. Also note that the back plate 62 has apertures 58 therein for being mounted to a proximate object. Note also that the hinged cap member 66 is shown in the open position thereby allowing the carrier unit of the present invention to be inserted. Also shown is the spring 70, the spring attachment means 72, along with the hinge 68.

Figure 12:
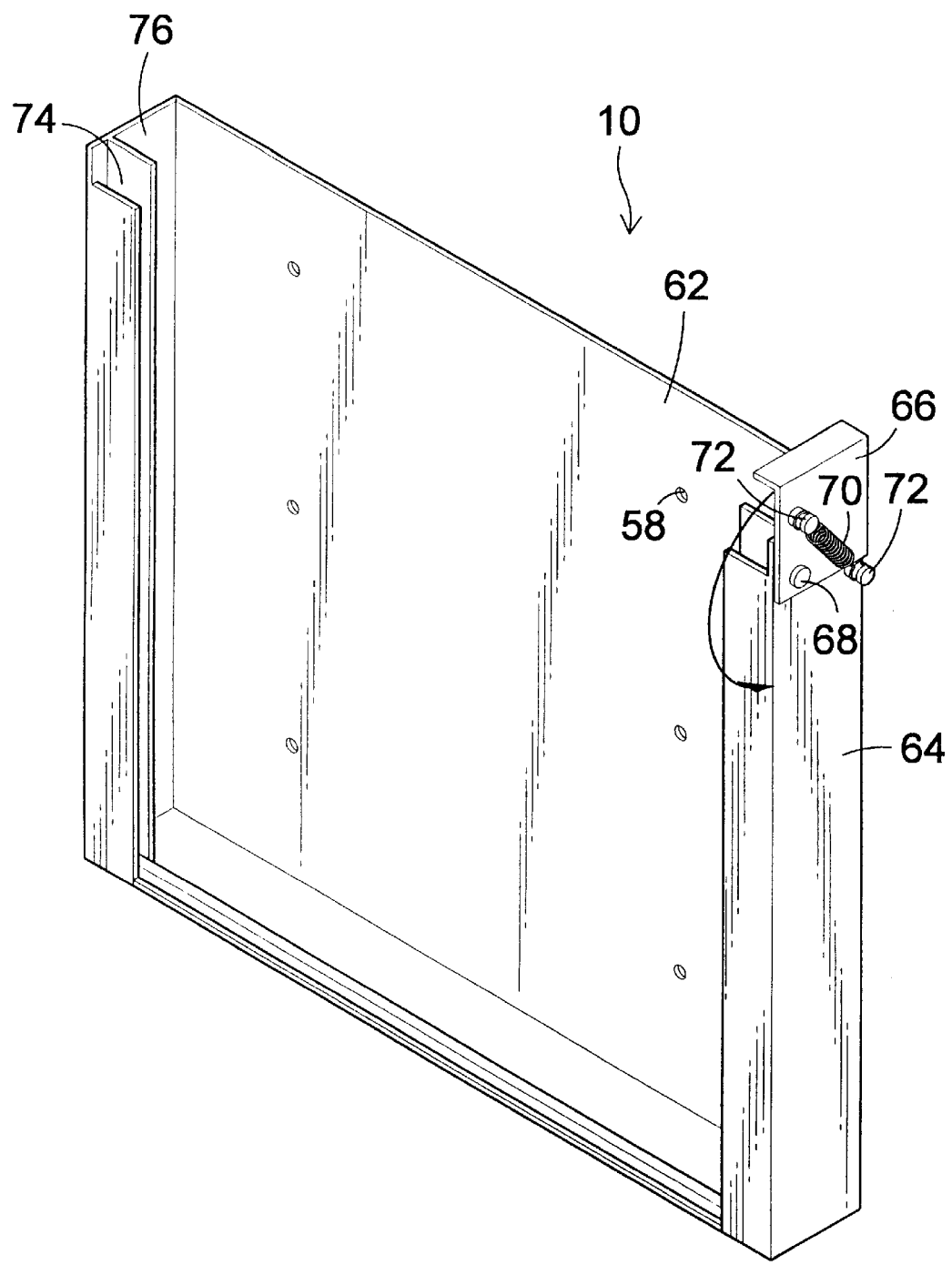
FIG. 12 is a perspective view of the alternate embodiment of the mountable storage frame having side track members and base plate providing a receptacle for the blade carrier unit and a cooperating spring cap member located at the top of the tracks in the closed position.

Turning to FIG. 12, therein is shown a perspective view of the alternative embodiment of the present invention 10. Shown therein is the receptacle unit having a back plate or base plate 62 along with side track members 64 which together form track 74 within which the present invention can be slidably inserted. Note also that a cavity or space 76 is provided in order to house the blades in a space wherein the blades cannot be damaged or damage anything else. Also note that the back plate 62 has apertures 58 therein for being mounted to a proximate object. Note also that the hinged cap member 66 is shown in the closed position thereby enclosing and securing the blade carrier unit of the present invention. Also shown is the spring 70, the spring attachment means 72, along with the hinge 68.

What is claimed to be new and desired to be protected by Letters Patent is:

1. An apparatus for holding saw blades, comprising:
   a) a base plate;
   b) a spindle mounted centrally on said base plate;
   c) said spindle communicating with both sides of said base plate;
   d) a cover plate located on each end of said spindle;

e) fastening means being attached on each end of said spindle wherein each of the saw blades is held between said cover plate and said base plate;

f) a tool holder being attached to said base plate and having a compartment whereby tools can be carried in said tool holder; and g) a spring tensioning member for frictionally holding said tools within said tool holder.

2. The apparatus of claim 1, said spindle further comprising threaded fastening means on each of its ends.

3. The apparatus of claim 1, said fastening means further comprising threaded fasteners.

4. The apparatus of claim 3, said threaded fasteners comprising wing nuts.

5. The apparatus of claim 1, further comprising a handle being attached to said base plate whereby said apparatus can be carried from place to place.

6. The apparatus of claim 1, further comprising multiple spacers being attached to the backside of said base plate.

7. An apparatus for holding saw blades, comprising:

a) a base plate;

b) a spindle mounted centrally on said base plate;

c) said spindle communicating with both sides of said base plate;

d) a cover plate located on each end of said spindle;

e) fastening means being attached on each end of said spindle wherein each of the saw blades is held between said cover plate and said base plate; and, g) an upper bracket and a lower bracket whereby said apparatus is mounted.

8. The apparatus of claim 7, further comprising a lip located on said upper mounting bracket and said lower mounting bracket.

9. The apparatus of claim 7, further comprising a receptacle member said receptacle member further comprising a back plate and end plates wherein said base plate can be stored.

10. The apparatus of claim 9, further comprising a hinged cap member whereby said base plate is secured within said receptacle member.

11. The apparatus of claim 9, further comprising a track formed in said receptacle member by said back plate and said end plates wherein said base plate can be stored.

12. The apparatus of claim 11, further comprising a hinged cap member whereby said base plate is secured within said receptacle member.

13. The apparatus of claim 7, further comprising multiple spacers being attached to the backside of said base plate.

14. The apparatus of claim 7, further comprising a tool holder being attached to said base plate whereby tools can be carried in said tool holder.

* * * * *